June 13, 1950     C. W. RANSON     2,511,376

ROTOR BLADE FOR HELICOPTERS

Filed May 12, 1947

INVENTOR.
Charles W. Ranson

Patented June 13, 1950

2,511,376

UNITED STATES PATENT OFFICE 2,511,376

ROTOR BLADE FOR HELICOPTERS

Charles W. Ranson, Cleveland, Ohio

Application May 12, 1947, Serial No. 747,393

8 Claims. (Cl. 170—135.4)

1

The present invention relates to a rotor blade for a helicopter and other rotating wing aircraft and more specifically relates to a means for providing boundary layer control over the surface of said blade.

The theory of boundary layer control of air flow over airfoils is well known. To summarize briefly, turbulent air flowing over a surface creates considerably more drag on that surface than would laminar flow. The reason that the layer of air adjacent to the surface becomes turbulent is that the air slows down because of friction with the airfoil surface, and this retarded layer of air constitutes an unstable flow that quickly becomes turbulent. The problem in boundary layer control is to re-energize the slow moving layer of air next to the surface by increasing the velocity of said air. Thus the boundary layer can retain its stability and remain laminar. A convenient method of re-energizing this surface flow is to eject a strong sheet of fluid from slots extending longitudinally in the blade surface.

The first object of this invention is to provide an improved mode of ejecting a sheet of boundary fluid rearwardly over a rotating blade so that there is no radial component of velocity of said sheet of fluid as said fluid is ejected. The second object is to provide an ejection slot so constructed that the fluid flowing therefrom will remain laminar. The third object is to provide an ejection slot constructed to transmit shear loads across said slot and to retain the torsional strength of the blade. The fourth object is to provide an ejection slot resistant to distortion of the airfoil surface and resistant to flutter locally. The fifth object is to provide a mode of boundary layer control wherein the optimum effects thereof are associated with the most critical azimuth positions of the rotor blade under conditions of translational flight of the aircraft. The sixth object is to provide a blade characterized by an improved boundary layer ejection slot of simplified assembly and low production cost. Other objects and advantages will appear as the specification proceeds.

The preferred form of the invention is illustrated in the appended drawings in which.

2

Figure 1:
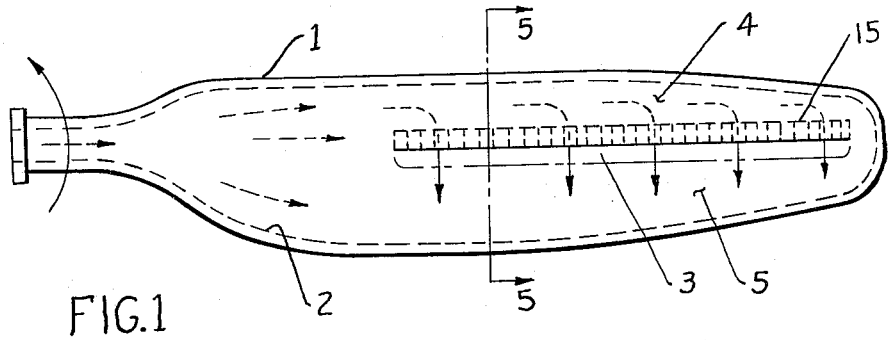
Fig. 1 is a plan form view of a rotor blade characterized by a longitudinally extending slot for ejecting boundary layer fluid.
Figure 5:
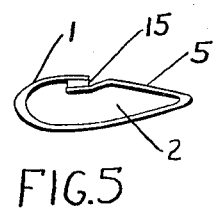

Fig. 5 is a cross-sectional view along line 5—5 of Fig. 1.

Previous efforts at obtaining boundary layer control of the air flow over revolving rotor blades have consisted of providing longitudinally extending slots or spaced perforations in the skin. In the former design a sheet of energized fluid is ejected into the transverse air flow, but said sheet of fluid is characterized by a radial component of velocity in addition to the rearward component of velocity. The radial component of velocity is caused by the axial flow of the fluid out through the interior of the blade and also is caused by the centrifugal force. The diagonal flow of ejected fluid across the blade is conducive to turbulence when said sheet of fluid mixes with the main transverse air flow. This turbulence is due to the fact that the direction of the air flow over the blade and the direction of flow of the ejected fluid are at great variance. As the two diverse flows join there is a strong tendency to form small vortices and to create turbulence. The design of spaced perforations in the skin also experiences the foregoing disadvantages and in addition tends to eject the fluid sheet away from the blade surface thereby inducing additional turbulence.

The present invention eliminates the foregoing disadvantages and in addition provides certain advantages as will be described. Fig. 1 shows a rotor blade of airfoil cross-section in which there is a longitudinally extending ejection slot 3 in the upper surface thereof. A similar slot may be located in the lower surface but is eliminated in this description for greater clarity. The ejection fluid enters blade 1 from the rotor hub or from other sources and flows into internal passage 2. The fluid is forced to flow outwardly to ejection slot 3 because of the pressure from a blower within the aircraft body or because of the dynamic pressure of forward flight and because of centrifugal pressures induced by blade rotation. Appropriate guide vanes may be used in accordance with conventional duct design to minimize turbulence in passage 2.

The internal fluid flows outwardly to slot 3 and the pressure in passage 2 forces said fluid out through slot 3 at high velocity. The manner in which the continuous sheet of boundary fluid is ejected from slot 3 is of great importance. The sheet of fluid must be ejected in such a way that the flow over the blade remains laminar. And this is the main object of the present invention.

Figure 2:
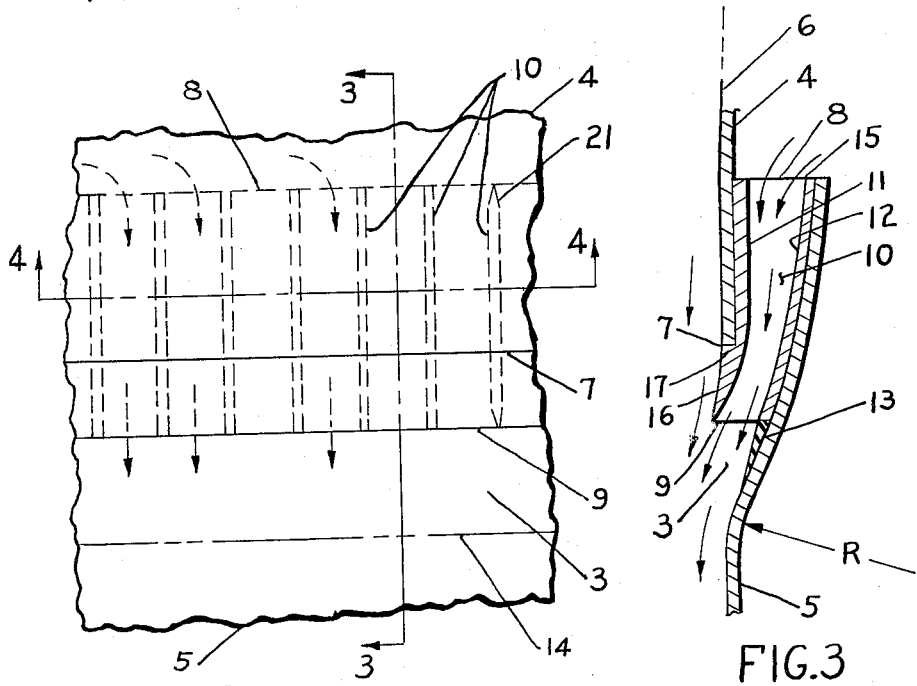
Fig. 2 is a fragmentary plan view of the detail construction of the ejection slot.
Figure 3:
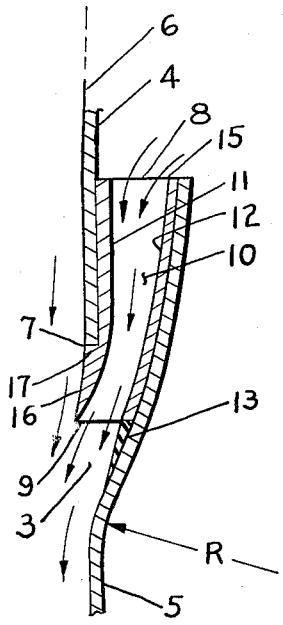
Fig. 3 is a cross-sectional view along line 3—3 of Fig. 2.
Figure 4:
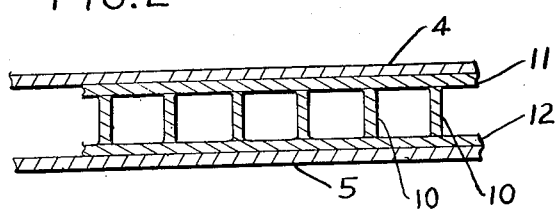
Fig. 4 is a cross-sectional view along line 4—4 of Fig. 2.

The invention can be best described by referring to Figs. 2, 3, and 4. Certain nomenclature will hereinafter be adopted and assigned in order to clarify the invention. Slot 3 is arbitrarily defined by the aft edge 9 of honeycomb 15 and by the mold line 14 of the bend of radius R in aft skin 5. Honeycomb 15 is comprised of an upper sheet 11, a lower sheet 12 and a plurality of longitudinally spaced vanes 10. Vanes 10 are perpendicular to sheets 11 and 12 and are secured thereto by solder or other means. Vanes 10 extend in a lateral direction with respect to the blade and direct the ejected fluid in the direction of the trailing edge of the blade. The elements 10, 11, and 12 of honeycomb 15 constitute an assembly that is manufacture separately, and is subsequently bonded or otherwise secured as a unit to forward skin 4 and aft skin 5. This facilitates the production process and reduces the manufacturing costs.

Honeycomb 15 has certain important characteristics. The forward or intake end 8 of the honeycomb is of greater width or intake area than is the aft or exhaust end 9. Thus honeycomb 15 functions as a nozzle and transforms pressure energy into kinetic energy. This kinetic energy is useful in accelerating the de-energized boundary layer of the main air flow over the blade. Thus the surface layer of the main air flow is speeded and laminar flow thereof is retained. Also the length of vanes 10 is relatively large with respect to the distance between successive vanes 10. Such a proportioning functions to damp out all radial components of velocity. Thus as the internal fluid is ejected from the aft end 9 of honeycomb 15, there is no radial component of velocity in said fluid. The fluid sheet is ejected in the direction of the trailing edge. Consequently, as blade 1 rotates under conditions of forward translational flight of the aircraft, the ejected fluid sheet will be most effective at the critical azimuth positions of the blade. For instance, at the azimuth angle of 90 degrees, as measured from the most rearward position of the blade, the rotational and translational velocities are additive, and the resultant velocity over the blade is at its greatest magnitude and it becomes important to provide optimum boundary layer control in order to minimize drag. And at an azimuth angle of 270 degrees the translational velocity is subtractive from the rotational velocity of the blade. The resultant velocity is small and the tendency is for the blade to stall. If effective boundary layer control is provided, however, the maximum lift coefficient of the blade is increased and the blade does not stall. In this way the maximum forward speed of the aircraft can be increased. Thus it is shown to be important to provide optimum boundary layer control at azimuth positions of 90 degrees and 270 degrees from the aft reference position. At these two positions the directions of the velocity vectors of the ejected fluid and of the main air flow are co-linear. As the ejected fluid and the main air flow come together under these circumstances the tendency for eddies and turbulence is minimized. At all other azimuth positions of the blade the resultant air flow over the blade is diagonal. However, the ejected sheet of fluid at all azimuth positions, continues to flow in a direction normal to the longitudinal axis of the blade. Hence, the velocity of the ejected fluid and of the main air flow for these other blade positions are non-co-linear and the tendency is to create small vortices and turbulences. However, these azimuth positions represent less critical positions of the blade and the effectiveness of the boundary layer control assumes less importance. Consequently it is readily seen that honeycomb 15 as herein constructed provides for the optimum aerodynamic performance of blade 1.

An additional feature of honeycomb 15 is the detail design of the upper sheet 11 thereof. Said sheet 11 is formed to lie against forward airfoil skin 4, and at the aft end 7 of skin 4 the thickness of sheet 11 is increased as indicated by shoulder 17 to fill out the airfoil contour. Portion 16 of sheet 11 is curved slightly and gradually outwardly from the theoretical airfoil contour. Thus the main external air flow is gently directed away from the airfoil contour so that the ejected sheet of fluid from slot 3 may flow smoothly between the main air flow and skin 5. Portion 16 of sheet 11 tapers to a thin edge to form a wedge in order to minimize the turbulence where the air streams join. The radius R of skin 5 is relatively large to provide a gradual change of direction of the ejected fluid sheet in order to minimize the tendency for centrifugal separation. Plastic filler 13 is bonded to skin 5 at the aft end of sheet 12 to provide a smooth air flow. The ends of vane 10 may be tapered to provide streamlining as shown by wedge 21 in Fig. 2.

The torsional rigidity of blade 1 is not deleteriously affected by the foregoing transverse discontinuity of the blade skin. The shear stresses are transmitted from aft skin 5 to forward skin 4 by vanes 10. The shears are resisted by a local bending couple in the vicinity of honeycomb 15. By providing appropriate thicknesses of material, the honeycomb and skin assembly is relatively rigid and functions as a continuous side of a torque box. Also the assembly of honeycomb 15 to the blade skins provides a stable and stiff structure that is locally resistant to flutter and vibrations.

I have illustrated only the preferred form of my invention, and it is to be understood that I do not limit myself to this exact form but intend to claim my invention broadly as set forth in the appended claims.

I claim:

1. In an elongated aircraft blade, a skin-like outer member of sheet material shaped to airfoil contour, said sheet member being laterally discontinuous along a longitudinal segment of said blade thereby defining a forward sheet member portion and an aft sheet member portion, said aft sheet member portion joggled below said forward sheet member portion in an underlapping manner and spaced therefrom to define an aftwardly directed elongated ejection orifice for fluid discharge, and an elongated honeycomb formed to associate with said ejection orifice, said honeycomb comprising a plurality of longitudinally spaced, laterally extending vanes of a length greater than the spacing distance between said vanes, and positioned substantially normal with respect to said blade sheet member, and elongated boundary skins shaped to define opposed wall surfaces for the closed sides of said honeycomb, and said vanes secured to said boundary skins to provide a unified honeycomb structure, and means for securing one of said honeycomb boundary skins to said forward sheet member portion, and means for securing the other of said honeycomb boundary skins to said aft sheet member portion.

2. In an elongated aircraft blade, a skin-like outer member of sheet material shaped to airfoil contour, said sheet member being laterally discontinuous along a longitudinal segment of said blade thereby defining a forward sheet member portion and an aft sheet member portion, said aft sheet member portion joggled below said forward sheet member portion in an underlapping manner and spaced therefrom to define an aftwardly directed elongated ejection orifice for fluid discharge, and an elongated honeycomb formed to associate with said ejection orifice, said honeycomb comprising a plurality of longitudinally spaced, laterally extending vanes positioned substantially normal with respect to said blade sheet member, and said vanes of greater height forwardly than rearwardly to provide a larger entrance area than exit area for said ejection orifice, and elongated boundary skins shaped to define opposed wall surfaces for the closed sides of said honeycomb, and said vanes secured to said boundary skins to provide a unified honeycomb structure, and means for securing one of said honeycomb boundary skins to said forward sheet member portion, and means for securing the other of said honeycomb boundary skins to said aft sheet member portion.

3. In an elongated aircraft blade, a skin-like outer member of sheet material shaped to airfoil contour, said sheet member being laterally discontinuous along a longitudinal segment of said blade thereby defining a forward sheet member portion and an aft sheet member portion, said aft sheet member portion joggled below said forward sheet member portion in an underlapping manner and spaced therefrom to define an aftwardly directed elongated ejection orifice for fluid discharge, and an elongated honeycomb formed to associate with said ejection orifice, said honeycomb comprising a plurality of longitudinally spaced, laterally extending vanes positioned substantially normal with respect to said blade sheet member and elongated boundary skins shaped to define opposed wall surfaces for the closed sides of said honeycomb, and the outer of said boundary skins formed to extend rearwardly of the aft edge of said forward sheet member portion and to curve gently outwardly from the airfoil contour in a manner to deflect external transverse airflow outwardly from the airfoil contour, and said vanes secured to said boundary skins to provide a unified honeycomb structure, and means for securing the outer of said honeycomb boundary skins to said forward sheet member portion, and means for securing the other of said honeycomb boundary skins to said aft sheet member portion.

4. In an elongated aircraft blade, a skin-like outer member of sheet material shaped to airfoil contour, said sheet member being laterally discontinuous along a longitudinal segment of said blade thereby defining a forward sheet member portion and an aft sheet member portion, said aft sheet member portion joggled below said forward sheet member portion in an underlapping manner and spaced therefrom to define an aftwardly directed elongated ejection orifice for fluid discharge, and an elongated honeycomb formed to associate with said ejection orifice, said honeycomb comprising a plurality of longitudinally spaced, laterally extending vanes positioned substantially normal with respect to said blade sheet member, and elongated boundary skins shaped to define opposed wall surfaces for the closed sides of said honeycomb, and the outer of said boundary skins formed to extend rearwardly of the aft edge of said forward sheet member and to curve gently outwardly from the airfoil contour in a manner to deflect external transverse airflow outwardly from the airfoil contour, and the outer of said boundary skins provided with a shoulder at the junction thereof with said forward sheet member in a manner to provide a flush external surface at said junction, and the thickness of the outer of said boundary skins decreasing rearwardly in a tapering manner to provide a knife-like aft edge thereof, and said vanes secured to said boundary skins to provide a unified honey-comb structure, and means for securing the outer of said honeycomb boundary skins to said forward sheet member portion, and means for securing the other of said honeycomb boundary skins to said aft sheet member portion.

5. In an elongated aircraft blade, a skin-like outer member of sheet material shaped to airfoil contour, said sheet member being laterally discontinuous along a longitudinal segment of said blade thereby defining a forward sheet member portion and an aft sheet member portion, said aft sheet member portion joggled below said forward sheet member portion in an underlapping manner and spaced therefrom to define an aftwardly directed elongated ejection orifice for fluid discharge, and said joggle being of gradual curvature to minimize centrifugal separation of fluid discharge, and an elongated honeycomb formed to associate with said ejection orifice, said honeycomb comprising a plurality of longitudinally spaced, laterally extending vanes positioned substantially normal with respect to said blade sheet member, and elongated boundary skins shaped to define opposed wall surfaces for the closed sides of said honeycomb, said vanes secured to said boundary skins to provide a unified honeycomb structure, and means for securing one of said honeycomb boundary skins to said forward sheet member portion, and means for securing the other of said honeycomb boundary skins to said aft sheet member portion.

6. In an elongated aircraft blade, a skin-like outer member of sheet material shaped to airfoil contour, said sheet member being laterally discontinuous along a longitudinal segment of said blade thereby defining a forward sheet member portion and an aft sheet member portion, said aft sheet member portion joggled below said forward sheet member portion in an underlapping manner and spaced therefrom to define an aftwardly directed elongated ejection orifice for fluid discharge, and said joggle being of gradual curvature to minimize centrifugal separation of fluid discharge, and an elongated honeycomb formed to associate with said ejection orifice, said honeycomb comprising a plurality of longitudinally spaced, laterally extending vanes of a length greater than the spacing distance between said vanes, and positioned substantially normal with respect to said blade sheet member, and said vanes of greater height forwardly than rearwardly to provide a larger entrance area than exit area for said ejection orifice, and elongated boundary skins shaped to define opposed wall surfaces for the closed sides of said honeycomb, and the outer of said boundary skins formed to extend rearwardly of the aft edge of said forward sheet member and to curve gently outwardly from the airfoil contour in a manner to deflect external transverse airflow outwardly from the airfoil contour, and the outer of said boundary skins provided with a shoulder at the junction thereof with said forward sheet member in a manner to provide a flush external surface at said junction, and the thickness of the outer of said boundary skins decreasing rearwardly in a tapering manner to provide a knife-like aft edge thereof, and said vanes secured to said boundary skins to provide a unified honeycomb structure, and means for securing the outer of said honeycomb boundary skins to said forward sheet member portion, and means for securing the other of said honeycomb boundary skins to said aft sheet member portion.

7. In an elongated aircraft blade, a skin-like outer member of sheet material shaped to airfoil contour, said sheet member being laterally discontinuous along a longitudinal segment of said blade thereby defining a forward sheet member portion and an aft sheet member portion, said aft sheet member portion joggled below said forward sheet member portion in an underlapping manner and spaced therefrom to define an aftwardly directed elongated ejection orifice for fluid discharge, and said joggle shaped to provide for the discharge of fluid substantially tangential to the surface of the airfoil, and an elongated honeycomb formed to associate with said ejection orifice, said honeycomb comprising a plurality of longitudinally spaced, laterally extending vanes spaced to damp out longitudinal components of velocity of internal fluid flow, and positioned substantially normal with respect to said blade sheet member, and elongated boundary skins shaped to define opposed wall surfaces for the closed sides of said honeycomb, and said vanes secured to said boundary skins to provide a unified honeycomb structure, and means for securing one of said honeycomb boundary skins to said forward sheet member portion, and means for securing the other of said honeycomb boundary skins to said aft sheet member portion.

8. In an elongated aircraft blade, a skin-like outer member of sheet material shaped to airfoil contour, said sheet member being laterally discontinuous along a longitudinal segment of said blade thereby defining a forward sheet member portion and an aft sheet member portion, said aft sheet member portion joggled below said forward sheet member portion in an underlapping manner and spaced therefrom to define an aftwardly directed elongated ejection orifice for fluid discharge, and an elongated honeycomb formed to associate with said ejection orifice, said honeycomb comprising a plurality of longitudinally spaced, laterally extending vanes positioned substantially normal with respect to said blade sheet member, and elongated boundary skins shaped to define opposed wall surfaces for the closed sides of said honeycomb, and said vanes secured to said boundary skins to provide a unified honeycomb structure, and the boundary skins of said honeycomb bonded to said sheet member to structurally unite said forward sheet member with said aft sheet member.

CHARLES W. RANSON.

REFERENCES CITED

The following references are of record in the file of this patent:

UNITED STATES PATENTS

| Number | Name | Date |
|---|---|---|
| 2,041,796 | Stalker | May 26, 1936 |
| 2,408,788 | Ludington | Oct. 8, 1946 |
| 2,476,002 | Stalker | July 12, 1949 |

FOREIGN PATENTS

| Number | Country | Date |
|---|---|---|
| 325,002 | Great Britain | Feb. 10, 1930 |
| 497,048 | Great Britain | Dec. 12, 1938 |